US 11,543,670 B2

(12) United States Patent
Ahling et al.

(10) Patent No.: US 11,543,670 B2
(45) Date of Patent: Jan. 3, 2023

(54) POLARIZING BEAM SPLITTER ASSEMBLY WITH DIFFRACTING ELEMENT

(71) Applicant: RealD Inc., Beverly Hills, CA (US)

(72) Inventors: Jay Ahling, Firestone, CO (US); Matthew Zimmer, Broomfield, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

(21) Appl. No.: 17/379,657

(22) Filed: Jul. 19, 2021

(65) Prior Publication Data

US 2022/0011586 A1  Jan. 13, 2022

Related U.S. Application Data

(63) Continuation of application No. 16/654,143, filed on Oct. 16, 2019, now Pat. No. 11,092,816.

(60) Provisional application No. 62/815,932, filed on Mar. 8, 2019.

(51) Int. Cl.
*G02B 27/28* (2006.01)
*G03B 21/14* (2006.01)
*G02B 27/01* (2006.01)

(52) U.S. Cl.
CPC ....... *G02B 27/283* (2013.01); *G02B 27/0172* (2013.01); *G03B 21/142* (2013.01)

(58) Field of Classification Search
None
See application file for complete search history.

(56) References Cited

U.S. PATENT DOCUMENTS

| 5,513,023 | A | 4/1996 | Fritz et al. |
| 6,398,370 | B1 | 6/2002 | Chiu et al. |
| 7,857,455 | B2 | 12/2010 | Cowan et al. |
| 7,905,602 | B2 | 3/2011 | Schuck et al. |
| 8,220,934 | B2 | 7/2012 | Schuck et al. |
| 9,958,697 | B2 | 5/2018 | Lee et al. |
| 2005/0157271 | A1 | 7/2005 | Tang |
| 2006/0119951 | A1 | 6/2006 | McGuire |
| 2015/0109539 | A1 | 4/2015 | Li et al. |
| 2015/0241622 | A1 | 8/2015 | Jung et al. |

FOREIGN PATENT DOCUMENTS

| EP | 2869116 A1 | 5/2015 |
| JP | 2006099844 A | 4/2006 |

OTHER PUBLICATIONS

EP-19918604.0 Extended European Search Report of European Patent Office dated Mar. 21, 2022.
PCT/US2019/056432 International Search Report and Written Opinion of the International Searching Authority dated Jan. 23, 2020.
Schott N-BK7 Datasheet 517642.251 (Feb. 1, 2014).

*Primary Examiner* — Bao-Luan Q Le
*Assistant Examiner* — Danell L Owens
(74) *Attorney, Agent, or Firm* — Penny L. Lowry

(57) ABSTRACT

A polarizing beam splitter assembly for directing image light on an input path into multiple exit light paths comprises multiple prisms with edges that meet to form a seam. The polarizing beam splitter assembly includes a diffracting element prior to the seam in the input light path. The diffracting element comprises a geometry that performs at least one of blocking a portion of the image light and scattering a portion of the image light.

20 Claims, 12 Drawing Sheets

EXAMPLE 1

EXAMPLE 2

EXAMPLE 1

EXAMPLE 2

EXAMPLE 3

EXAMPLE 4

1400

POLARIZING BEAM SPLITTER ASSEMBLY WITH DIFFRACTING ELEMENT

TECHNICAL FIELD

This disclosure relates to projection systems for projecting images for a three-dimensional viewing experience, and more particularly relates to suppressing image defects generated by a polarization beam splitter.

BACKGROUND

In recent years, cinemas and image projection systems have used 3D projection systems that use polarized light to encode the left-eye and right-eye images to form stereoscopic imagery when viewed through polarization filtering eyewear. In some cases, light-doubling polarization projection systems such as those available from RealD Inc. have used multiple paths to minimize light intensity losses from polarization control components, thereby maximizing the amount of image light that reaches the screen to create a brighter cinematic experience for the viewer. Some examples of light-doubling systems include those taught by commonly-owned U.S. Pat. No. 7,905,602, commonly-owned U.S. Pat. No. 8,220,934, commonly-owned U.S. Pat. No. 7,857,455, and commonly-owned U.S. Pat. No. 9,958,697, all of which are herein incorporated by reference in their entireties.

Such light-doubling systems utilize a Polarizing Beam Splitter (PBS) that generally splits input image light into multiple directions. In some systems, e.g., two-beam systems, input image light is split into two directions—a transmitted path and a reflected path, each path having a different polarization state. In other systems, known in the industry as three-beam systems, there may be a transmitted path and two reflected paths. In such systems, the light in each path may be processed by polarization control components and then the polarization-encoded image light is recombined on a polarization-preserving screen to be viewed by a person with polarization filtering eyewear.

SUMMARY

Disclosed herein is a polarizing beam splitter (PBS) assembly for directing image light on an input light path into multiple exit light paths. The PBS assembly may include a top prism having a first surface adapted to receive the image light on the input light path. The top prism may also include a second surface adapted to direct the image light along a first exit light path. The first and second surfaces of the top prism may meet to form a first edge.

The PBS assembly may also include a bottom prism having a first surface adapted to receive the image light on the input light path. The bottom prism may also include a second surface adapted to direct the image light along a second exit light path that is different from the first exit light path. The first and second surfaces of the bottom prism may meet to form a second edge. The first edge, which is on the top prism, and the second edge, which is on the bottom prism, may meet to form a seam.

The PBS assembly may also include a center prism between the top prism and the bottom prism. The center prism may have a first surface adjacent to the second surface of the top prism, and the center prism may have a second surface adjacent to the second surface of the bottom prism. The first and second surfaces of the center prism may meet to form a third edge. The third edge, which is on the center prism, may meet the first edge, which is on the top prism, and the second edge, which is on the bottom prism, at the seam.

The PBS assembly may also include a diffracting element aligned with the seam prior to the seam in the input light path. The diffracting element may comprise a geometry that performs at least one of blocking a portion of the image light and scattering a portion of the image light.

The PBS assembly may also include a planarization plate prior to the seam in the input light path. The planarization plate may be adjacent to the first surface of the top prism and to the first surface of the bottom prism. The planarization plate may be made of optical grade glass, such as Schott BK7. In some embodiments, the diffracting element is located on a surface of the planarization plate. In some embodiments, the diffracting element comprises a chrome or chrome oxide feature produced by a photolithography process.

Also disclosed herein is a stereoscopic image apparatus which includes a PBS assembly as described herein. The stereoscopic image apparatus may also include one or more reflective members in one or more of the exit light paths. Light reflected by the first and second reflective members may form a single stereoscopic image on an image-forming surface, such as a screen. In some embodiments, the stereoscopic image apparatus may also include one or more polarization modulators adapted to switch the polarization state of the image light on at least one of the first exit light path and the second exit light path between a first state of polarization and a second state of polarization.

DETAILED DESCRIPTION

Figure 1:
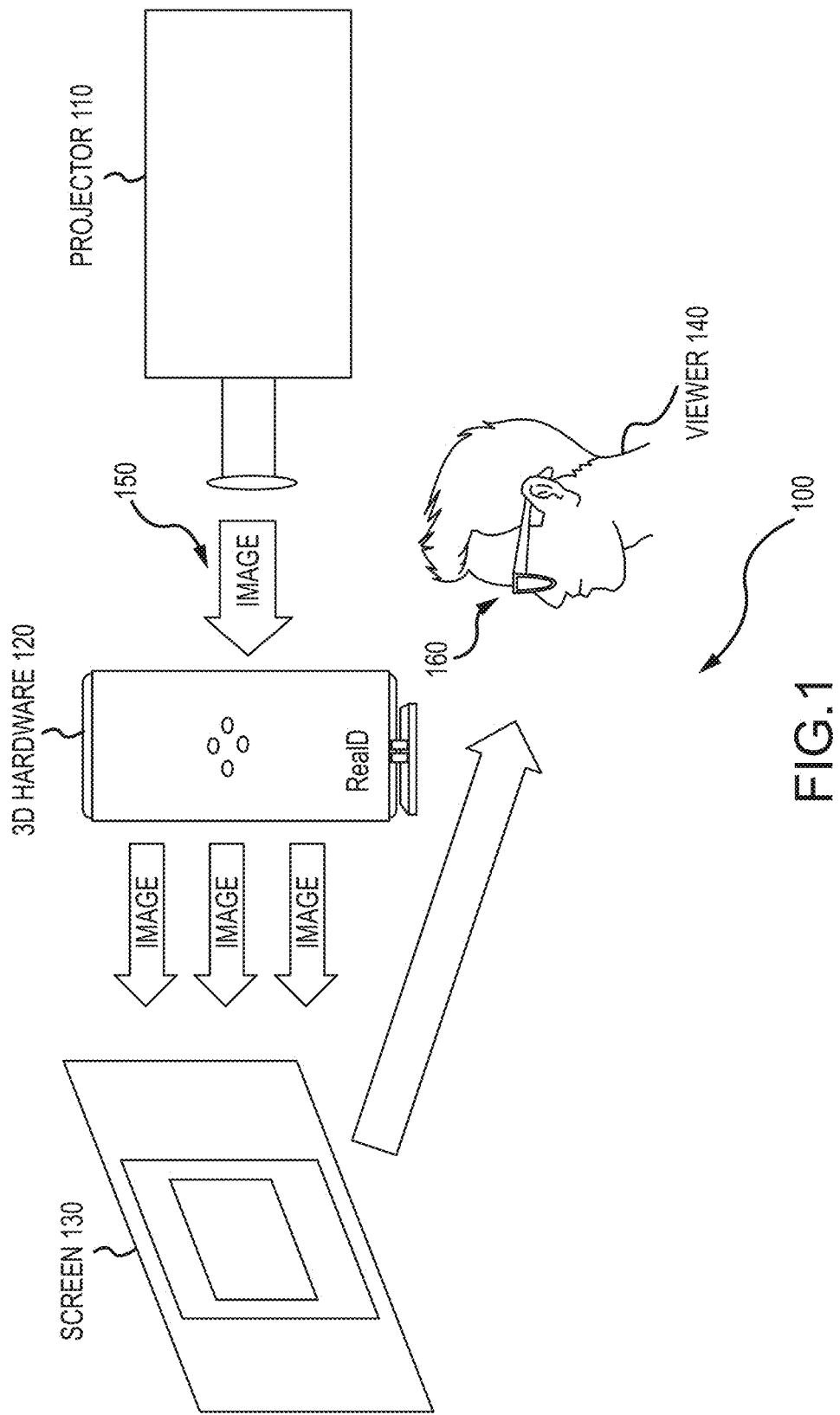
FIG. 1 illustrates an example synchronized, high resolution 3D projection system utilizing 3D hardware including a PBS for separating light into multiple paths.

Disclosed herein is a PBS assembly utilizing an optical bonding process to improve and overcome potential deficiencies in the PBS assembly that may result in on-screen image smearing and banding. The image smearing and banding may be a direct result of, for example, image splitting and index mismatching failures that may occur at the optical junction of three individual prism alignments. A theoretically perfect PBS assembly would have no space between the two prisms defined as the top and bottom prisms in the assembly. The top and bottom prism edges may mate to the center prism edge at the input side of the PBS. A space or gap at this location may result in a materials index mismatch due to a PBS coating that may be present on the prisms. The PBS coating may be, for example, a multi-layer thin film dielectric stack, a wire grid thin film metal, or any other appropriate coating. An index mismatch can also be caused by other assembly defects such as trapped gas or foreign contaminants, for example.

The PBS design may utilize a PBS coating, such as a multilayer thin film reflective coating or wire grid thin film metal, to separate the single input light path into multiple paths. These special coatings may be applied to some of the prism surfaces that comprise the PBS. If full coating coverage does not occur or is non-uniform in coating thickness, an index mismatch may result in some regions of the prism surfaces. Coating deposition errors for the individual prisms that comprise the PBS and/or errors in the manufacturing assembly processes for the PBS may result in index mismatching at the prism junctions which may, in turn, result in light diffraction and/or refraction at that location.

Suppression of the light diffraction, which may be caused, for example, by splitting the input image light and/or by an index mismatch in the PBS assembly, may be achieved by blocking and/or scattering the image light prior to the central PBS prism junction, thus controlling the diffraction behavior of the light. The bonding technique may be achieved by first creating a narrow light blocking and or scattering geometry at the image light input side of the PBS.

One type of PBS may be fabricated by bonding optical prisms together to form a single bonded optic. One function of a PBS is to split light into two or more optical paths. Some theater projection systems utilize hardware that converts outgoing light images to right and left hand circular polarization (CP) states to be received by a viewer wearing CP eyewear that decodes the left and right polarization states. Such theater projection systems thus yield stereoscopic three dimensional (3D) images. In many of these systems, light loss exists due to, for example, linear polarization films in the 3D hardware and/or losses from other materials and optical components within the light paths.

Multiple path systems that overlay images from separate paths increase brightness and system light efficiency, and are sometimes referred to as light recycling systems. The splitting of light is achieved by using a PBS that separates input image light into multiple exit paths. Recombining paths at the screen increases the total light efficiency and reduces light loss caused by linear polarizers and/or additional optical components.

Three-path optical systems that use a PBS assembled from three separate prisms may suffer from a number of deficiencies. In some applications, one or more of these deficiencies manifest as a visible on-screen defect observable by a viewer of content transmitted and/or reflected through a PBS. Input image light may be completely passed through one path of the PBS (the transmitted path). Also, the input image light may be separated by angled surfaces on which PBS coatings may have been deposited, therefore creating two reflected paths. One fundamental deficiency that may be associated with this approach to light beam separation is that diffraction caused by the edge boundary may be introduced when splitting a single image into multiple images. At the junction of the three prisms, there may exist a region of refractive index (RI) mismatch. This region may create a visible seam, introducing additional sharp edge boundaries which may cause diffraction. In this disclosure, the term "seam" is used to define the junction of the prisms, which may include such a region of potential RI mismatch. The light diffraction at the PBS seam may result in a vertical smearing of images on-screen that can be readily observable by a viewer under some viewing conditions. The diffraction may also cause a visible horizontal banding across the full cinema screen that can appear, for example, as a dark grey band or a colored band depending on the input light source. These effects may be received as a visual hindrance to most 3D viewers and may require a solution to vastly suppress or eliminate the on-screen visibility.

Disclosed herein is a solution to largely suppress the unidirectional image smearing and banding generated at the seam of a PBS. The solution disclosed may be implemented in the assembly process and may suppress the inherent diffraction caused by splitting the input image light. Further, diffraction may be caused or worsened by poor index matching at the prisms seam due to, for example, abrupt changes in the PBS coating thickness, incomplete PBS coating coverage, and/or too large of a space between the top and bottom prisms within the PBS assembly.

FIG. 1 illustrates an example high resolution sequential 3D system 100 utilizing a digital theater projector 110, polarization controlled stereoscopic 3D hardware unit 120 operating at 144 Hz, and a screen 130 where 3D content is viewed and located downstream of the projection system. In this example illustration, the 3D hardware is a three-path system that separates image input light 150 into right-eye and left-eye polarization states that are delivered to the screen 130, reflected, and then decoded with the viewer's cinema eyewear 160. If the 3D hardware unit 120 does not implement the PBS assembly utilizing an optical bonding process to improve and overcome potential deficiencies in the PBS assembly disclosed herein, image defects may be observed at the screen 130 by the viewer 140.

In addition to a PBS assembly, in some embodiments the hardware unit 120 includes at least one of (1) at least one reflective member, for example a mirror, to modify light reflected by the PBS to form a single stereoscopic image on an image-forming surface such as the screen 130, (2) at least one polarization modulator to modulate the light reflected by the reflective member and the light transmitted through the PBS, and (3) at least one refractive member to refract light.

Figure 2A:
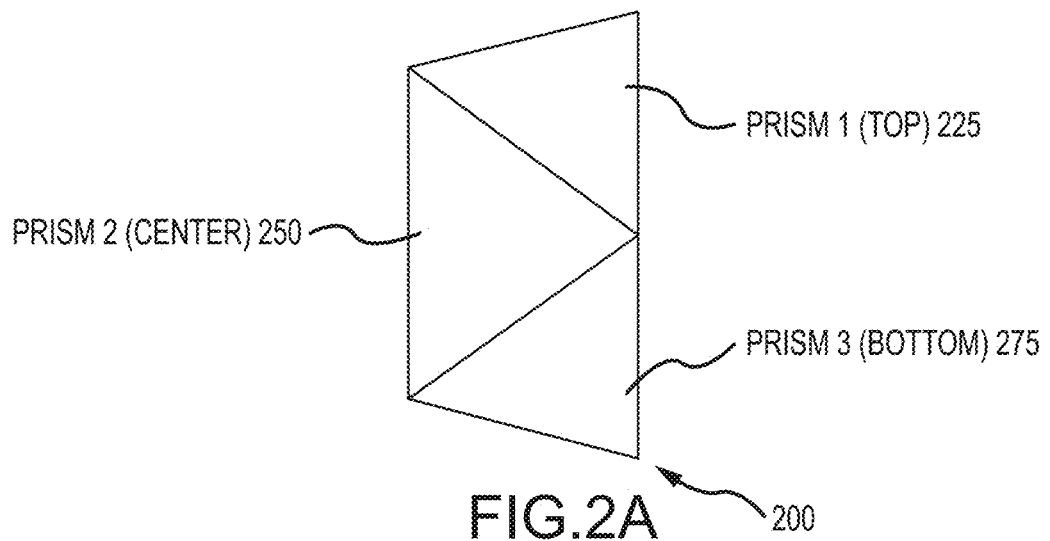
FIG. 2A illustrates a cross-sectional view of an example PBS derived from three individual prisms.
Figure 2B:
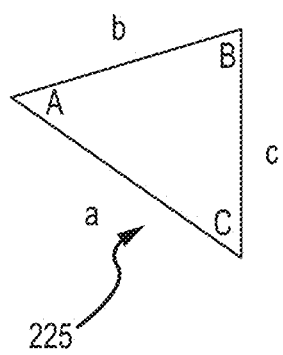
FIG. 2B illustrates a first of three individual prisms in an example PBS.
Figure 2C:
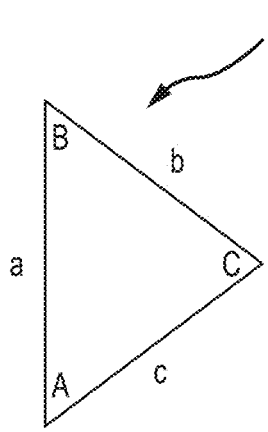
FIG. 2C illustrates a second of three individual prisms in an example PBS.
Figure 2D:
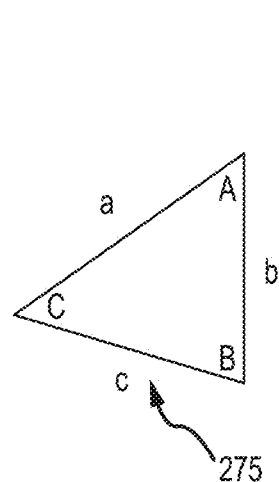
FIG. 2D illustrates a third of three individual prisms in an example PBS.

FIG. 2A illustrates a PBS assembly 200 incorporating three individual prism components. FIG. 2B illustrates a top prism 225 defined by the given angle set (A, B, and C) and leg lengths (a, b, and c) for this prism. A PBS coating, such as a multi-layer thin film reflective coating or wire grid thin film metal, may be deposited on the surface defined by leg (a). Leg (a) of prism 225 may be the surface that is optically bonded to leg (b) of prism 250 using an index-matched optically clear adhesive. FIG. 2C illustrates a center prism 250 defined by the given angle set (A, B, and C) and leg lengths (a, b, and c) for this prism. FIG. 2D illustrates a bottom prism 275 defined by the given angle set (A, B, and C) and leg lengths (a, b, and c) that may be equal to that of prism 225. A PBS coating may be deposited on the surface defined by leg (a). Leg (a) of prism 275 may be the surface that is optically bonded to leg (c) of prism 250 using an index-matched optically clear adhesive. This PBS design can be used in stereoscopic 3D hardware image and video generation and incorporated in cinema theaters world-wide.

Figure 3:
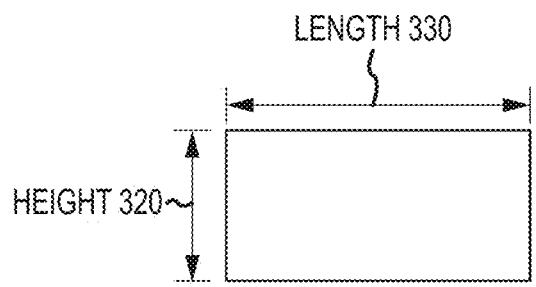
FIG. 3 illustrates an example planarization plate.
Figure 3:
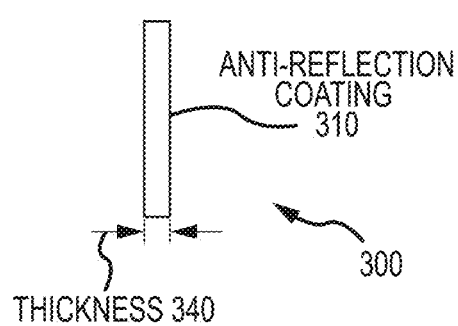

FIG. 3 shows an example planarization plate 300 comprising glass having a height 320, a length 330, and a thickness 340. The glass can be any optical grade glass; however, Schott BK7 or equivalent may be preferred due to its exceptionally high transmission and ability to accept precision polishing for yielding a very high level of surface flatness. A multi-layer thin film low reflectance anti-reflection (AR) coating 310 may be deposited on at least one side of the planarization plate to minimize the reflection at the interface of the projection lens.

Figure 4A:
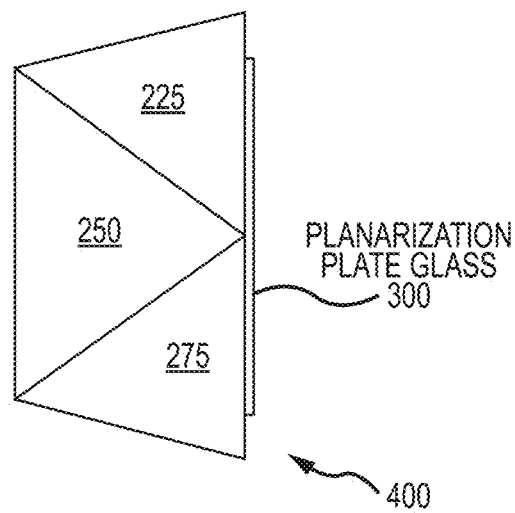
FIG. 4A illustrates a cross-sectional view of an example planarization plate attached to three prisms of an example PBS.
Figure 4B:
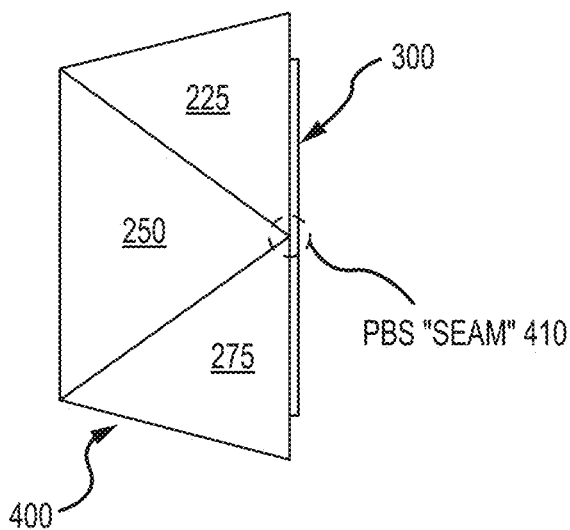
FIG. 4B illustrates the location of a center seam of an example PBS assembly derived from three individual prisms and a planarization plate when bonded together.
Figure 4C:
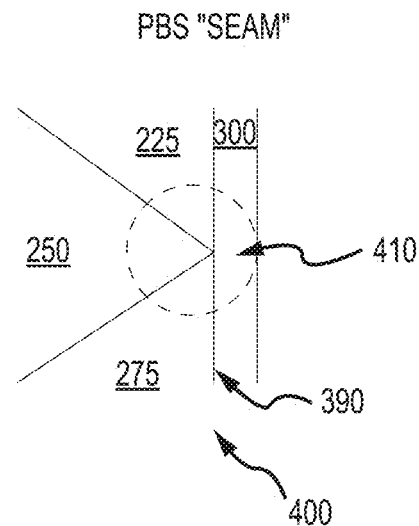
FIG. 4C illustrates a magnified view of a center seam.

FIG. 4A shows a cross-sectional view of an example PBS assembly 400 incorporating three individual prism components 225, 250, 275 and a planarization plate 300. The planarization plate 300 may be centered about the input surface. The dimensions of the planarization plate 300 can change for system design and assembly considerations. FIG. 4B illustrates a cross-sectional view of the location of a seam 410 of the three edges of a bonded prism set at the interface of the entrance planarization plate 300 and prism set 225, 250, 275. This is a location where light diffraction may occur, causing unsightly image defects on-screen that can be observed by a viewer. FIG. 4C depicts a cross-sectional magnified view of the location of the seam 410 of the PBS assembly 400.

Figure 5:
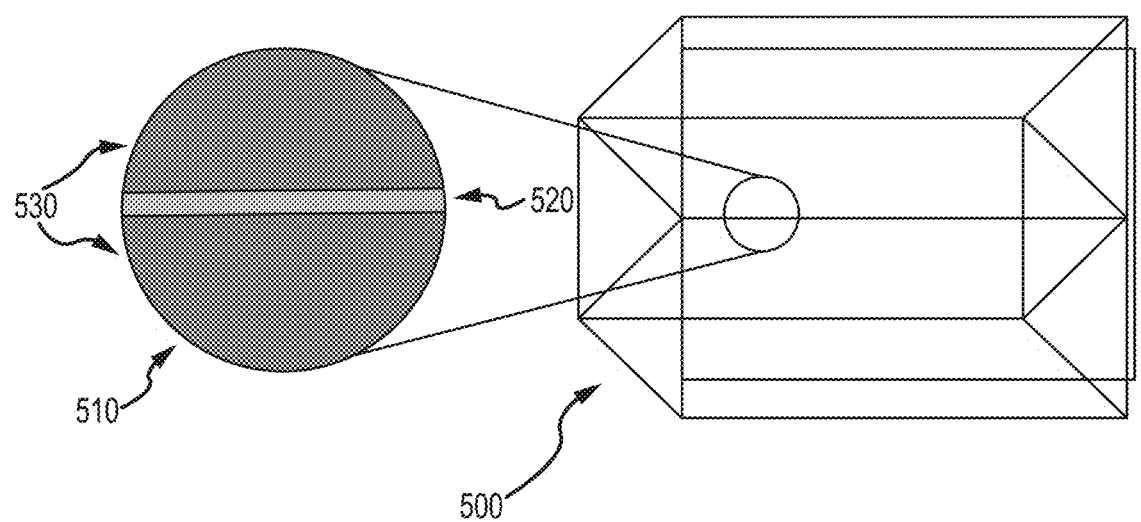
FIG. 5 illustrates an example PBS assembly with a magnified view of a typical observation of a PBS seam.

FIG. 5 illustrates the seam of a fully assembled example PBS 500 that also includes a magnified view 510 of the seam. In this example, the magnified view 510 depicts a light grey region 520 bordered by dark grey regions 530 where the sharp boundaries define the narrow region of RI mismatch. This narrow region can vary in width across the PBS 500 which can directly result in increased or decreased levels of scatter observed on-screen.

Image splitting may cause light diffraction at the seam. RI mismatch at the seam may result in additional light diffraction about the mismatch boundaries. The resulting on-screen image defect may be referred to as "Image Flare" or scatter. "Image Flare" may be defined as a vertical ghost image that diffusely projects, or smears, above and below the center of the image. The visibility of the "Image Flare" may be directly related to the size (width) of the RI mismatch region. For example, if the RI mismatch region running parallel to the PBS input seam is narrow, the observed "Image Flare" on-screen may be minimized. Likewise if the RI mismatch region running parallel to the PBS input seam is wide, the observed "Image Flare" on-screen may be maximized. The visibility of the "Image Flare" can be dependent on other factors. For example, in a high dynamic range (HDR) theater setup the "Image Flare" can become more visible. Another example of how "Image Flare" may be more easily observed is when using a high contrast projection lens. "Image Flare" may also be more prominent with high contrast content. An example of high contrast content is white text on a black background.

Figure 6:
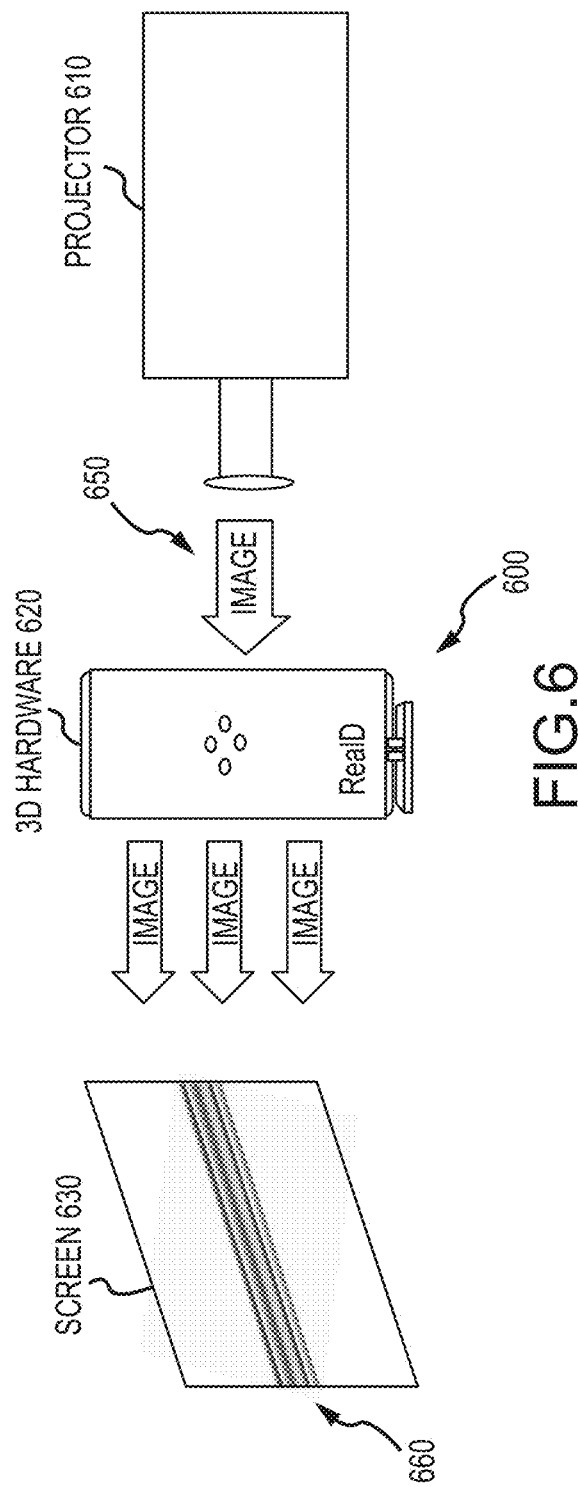
FIG. 6 illustrates an example synchronized high resolution 3D projection system utilizing 3D hardware and demonstrating an example of on-screen banding caused from a PBS seam.

FIG. 6 illustrates an example 3D projection system 600 that includes three-beam 3D polarization conversion hardware 620 where the on-screen 630 diffractive banding effect 660 may be caused by the diffraction from the PBS seam. The PBS may be located within the 3D hardware unit 620. The severity of the banding 660 may be affected, for example, by the PBS seam characteristics, 3D hardware 620 positioning, projector 610 type, projector lens, projector light source, projector light brightness, throw ratio, projector content 650, theater conditions and other variables. When projecting high contrast images the defect visibility may be far more severe. Likewise, the source type can add visual alterations to the observed banding 660. For example, a Xenon lamp may result in on-screen banding that appears as dark grey to light grey transitions, whereas a red, green, blue laser source may result in on-screen chromatic banding transitions. The resulting on-screen banding caused by the light diffraction at the seam can appear visually different due to many contributing variables.

Figure 7:
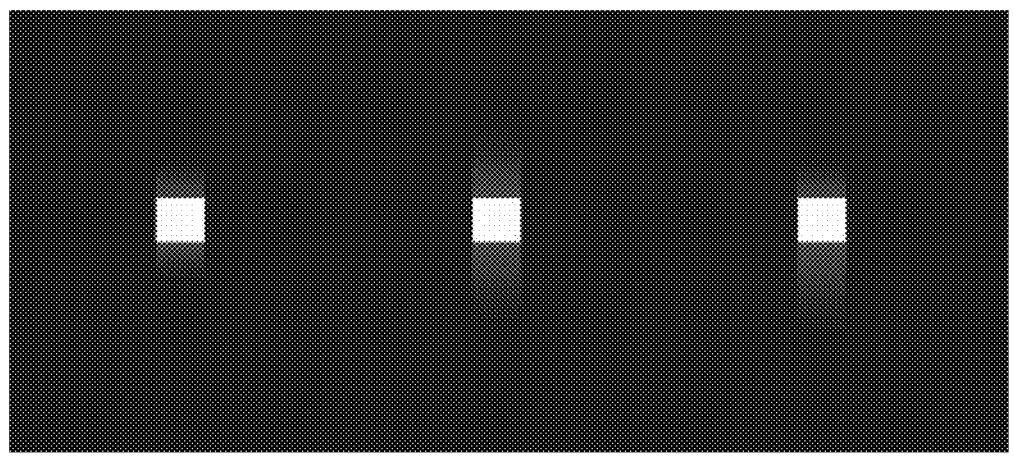
FIG. 7 illustrates an example of image defects as observed on a screen by a viewer.

FIG. 7 illustrates an example of "Image Flare" as it appears on-screen 700 when viewing normal to the screen. In this example, high contrast content that consists of white squares on a black background is being displayed in an HDR setup. Within the projection system setup, the 3D hardware may be positioned so that the white boxes are centered horizontally to the center of the seam of the PBS. The severity of the "Image Flare" may be dependent on contributions of the separate paths and other contributing factors previously discussed. FIG. 7 demonstrates differing severity of "Image Flare" in both top and bottom locations off the left, center, and right white squares observed. The "Image Flare" observed in FIG. 7 may be caused directly by light diffraction at the input seam interface of the PBS.

Suppressing diffraction generated at the seam may require proper assembly of the three prisms that comprise the PBS as well as a thin line geometry diffracting element aligned with the seam. This diffracting element may be added onto the planarization plate, where this thin line geometry diffracting element can be well aligned to the PBS seam. This geometry is designed to mask the visibility of the "Image Flare" resulting from both the PBS seam and the inherent diffraction caused by the upper and lower path light splitting.

With respect to the assembly of the three prisms, firstly the prism coating should have complete coverage of the prism surface. Thin film coating processes may require the glass surface to be held or fixtured in the coating chamber and may require special masks that control the thin film coating placement. Coating edge effects can occur as well; for example, chips and scalloped edges may impact thin film coating by resulting in coating non-uniformities at such edge effect locations. These are examples of coating process details that could result in incomplete or inadequate coating coverage on a glass surface. A full coverage coating may be required in order to ensure proper index matching within the assembly.

Secondly, it is also important to maintain a precision edge on the prisms. Imperfections on the edges that form the seam can be caused by polishing errors, handling damage, pyramidal defects, and rounded edges.

If prisms that have full coating coverage and precision edges are chosen to be used in the assembly of a PBS, they should be then mated together in a precise manner using a thin layer of optical bonding adhesive. During the assembly, no space should exist between the coated prism edges.

Critical fixturing may be necessary to maintain and hold proper alignment of the individual prisms during the assembly and adhesive cure.

The approach to suppress diffraction disclosed herein may utilize well-controlled and dimensioned geometries placed at the central input of the PBS, and aligned to the PBS seam. It should be obvious to those familiar with the relevant art that there are multiple surfaces on which the geometries can reside. Examples of possible surfaces where the geometries could be located are the entrance surface of the PBS, the bonded surface of the planarization plate, and the entrance surface of the planarization plate. This approach may offer a solution that can be easily implemented into an existing PBS assembly process. Preferably, the geometry is located in close proximity to the seam.

Diffraction is the spreading of light waves caused by obstacles, edges, and openings in a light path. Because light propagates as a wave, it spreads after passing an edge. The edge boundary characteristics may determine the directionality of the light scatter. In the case of a linear sharply defined edge in a horizontal orientation (as is the case with the PBS), the light waves will scatter in the vertical direction. The human eye is quite effective at detecting straight lines and linear features. The unidirectional nature of the scatter generated at the PBS seam is particularly noticeable on-screen by viewers. The solution disclosed herein deliberately introduces a diffracting element that redirects scatter in random directions. There are considerations in the design of the geometry that may suppress the diffraction. These include but are not limited to the geometry material, geometry coating thickness, geometry size, edge feature frequency, edge feature phase, edge profile, edge feature frequency and amplitude variation, and the geometry width-to-edge profile ratio. The material design can be opaque, semi-opaque, or transparent and can have a smooth or rough surface and incorporate diffuser type elements.

The edge geometry is a primary variable in controlling scatter. A goal of the edge geometry is to uniformly scatter light in many directions to suppress the directionality caused by a sharp linear edge boundary. Examples that could be considered as an edge shape include, but are not limited to, a sawtooth, offset sawtooth, sine wave, offset sine wave, square wave, offset square wave, stepped square wave, individual lines at differing orientations and spacing, individual circles or ovals at differing orientations and spacing, overlaid geometries, gradient features, and a linear gradient feature having a Gaussian-type transmission profile.

In the example of the planarization plate 300 in FIG. 3 and FIGS. 4A-4C, the bonded surface 390 may be the preferred surface for the location of the geometry. The planarization plate's main function is to control wavefront distortion. The plate's bonded surface 390 may be a preferred location for multiple reasons. The planarizer glass may be far less costly and much lower risk to use than the assembled PBS. The planarization plate may be small, thin, and lightweight which makes it easy to handle. It may be simpler to add features on a small, thin, lightweight piece of planarization plate glass, compared to that of the large, heavy, bulky, and costly assembled PBS. One example of how the geometry may be added is by utilizing metal on glass lithography where a metal geometry is patterned and etched. It may be important that the geometry be as close in proximity to the PBS seam as possible to minimize the separation between the feature and seam to achieve masking and light scatter control at the same special location. This is another reason why the bonded surface, which is closest to the seam, may be preferred. However, in some embodiments, the geometric feature may be located not in close proximity to the seam.

The disclosed bonding method may incorporate a modified planarization plate. For example, the bonded surface side of the glass plate may be processed using photolithography methods. The lithography processing could utilize any single or combined geometry examples defined above, or additional geometries determined to be effective may be used. The plate's non-processed surface can receive a thin film anti-reflective coating to minimize input reflections as the light enters the PBS. For example, upon completion of the photolithography process, the plate may yield a chrome or chrome oxide feature at the center of the plate's long axis. This feature, which is designed to uniformly scatter or diffuse light along its edge, may then be aligned to the PBS seam during the bonding process to attach the planarization plate to the PBS.

Figure 8:
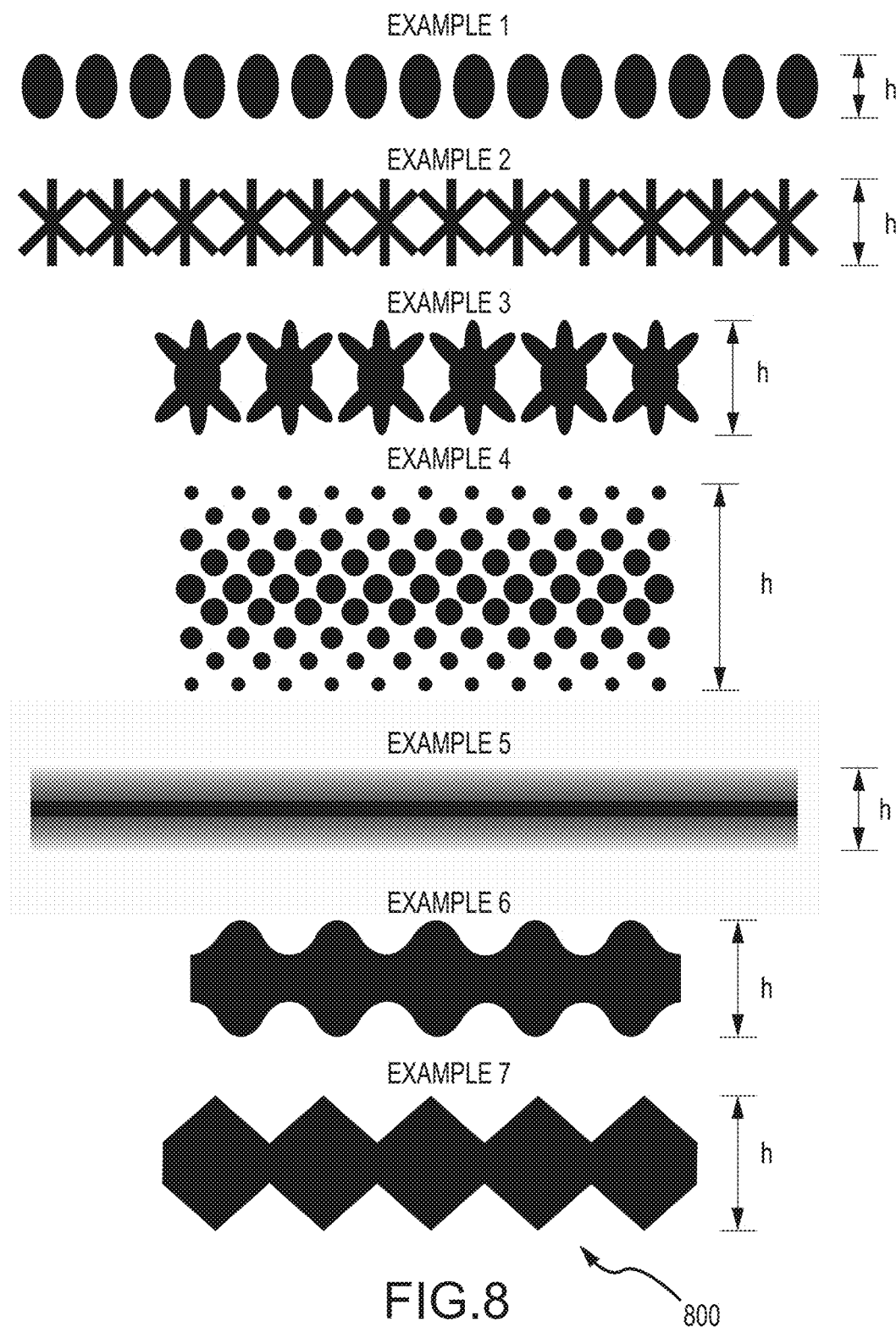
FIG. 8 illustrates examples of geometries that, when aligned to the PBS seam, may suppress effects caused by the seam.

FIG. 8 illustrates a plot 800 of schematic examples of geometries in a diffracting element that may suppress PBS seam diffraction. Care is needed when establishing the feature height (h) with relation to the projector lens pupil size and projection distance to the screen. There are at least two purposes of the feature. The first purpose is to mask the seam region of the PBS either fully or partially, and the second purpose is to intentionally scatter light about the seam region in a uniform and well-controlled manner. However, if the feature becomes too large in relation to the pupil size, the amount of light that is being blocked may become visible on-screen as a dark band. It is well known in the relevant art that straight lines diffract light in a unidirectional fashion, and sharp points directionally concentrate scatter. For these reasons, linear edges and sharp angles may be avoided. In FIG. 8, Example 2 shows geometries with linear edges and sharp angles, and Example 3 shows geometries with soft edges and rounded points. Example 6 and Example 7 demonstrate a similar relationship as to Example 2 and Example 3. Example 5 illustrates a gradient geometry where the center-most region of the geometry yields the smallest amount of light transmission, and the top and bottom boundaries of the center region begin the locations where light transmission gradually increases. Example 5 could also be described as a neutral density gradient where the central region blocks a high percentage of light and, moving away from the central region, the gradient transitions from a high percentage to a low percentage of light blockage.

Figure 9:
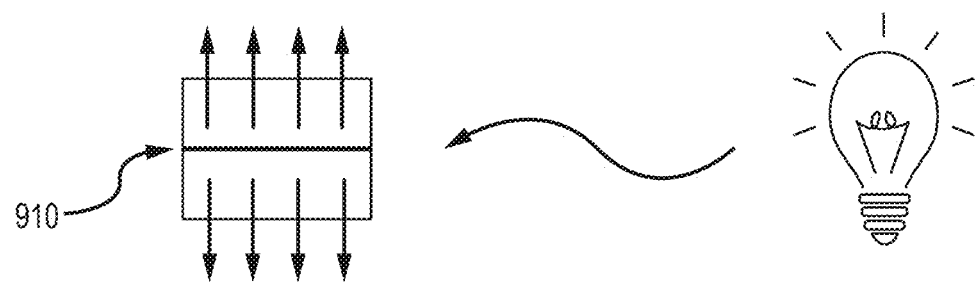
FIG. 9 illustrates example diffraction behavior.
Figure 9:
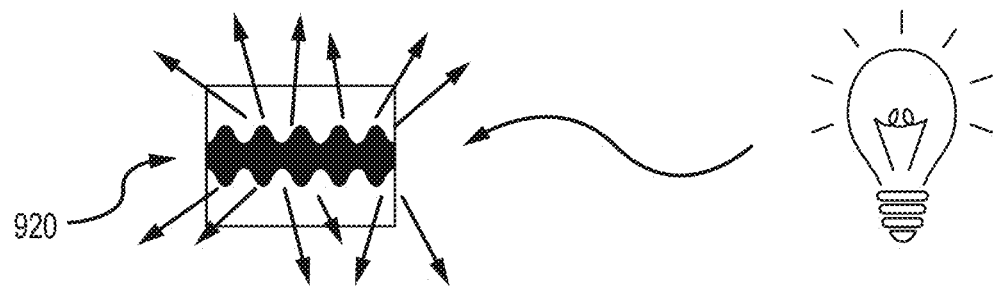

FIG. 9 demonstrates example diffraction behavior caused by a linear feature 910 and a sinusoidal feature 920. The scatter off of the linear feature 910 shown in Example 1 is unidirectional and results in apparent "Image Flare" as well as diffractive banding on-screen. Example 2 demonstrates that the scatter off the curved sinusoidal feature 920 is randomized and results in diffuse uniform light behavior. Light scatter in Example 2 is less apparent to the viewer and diffractive banding may be suppressed on-screen.

Figure 10:
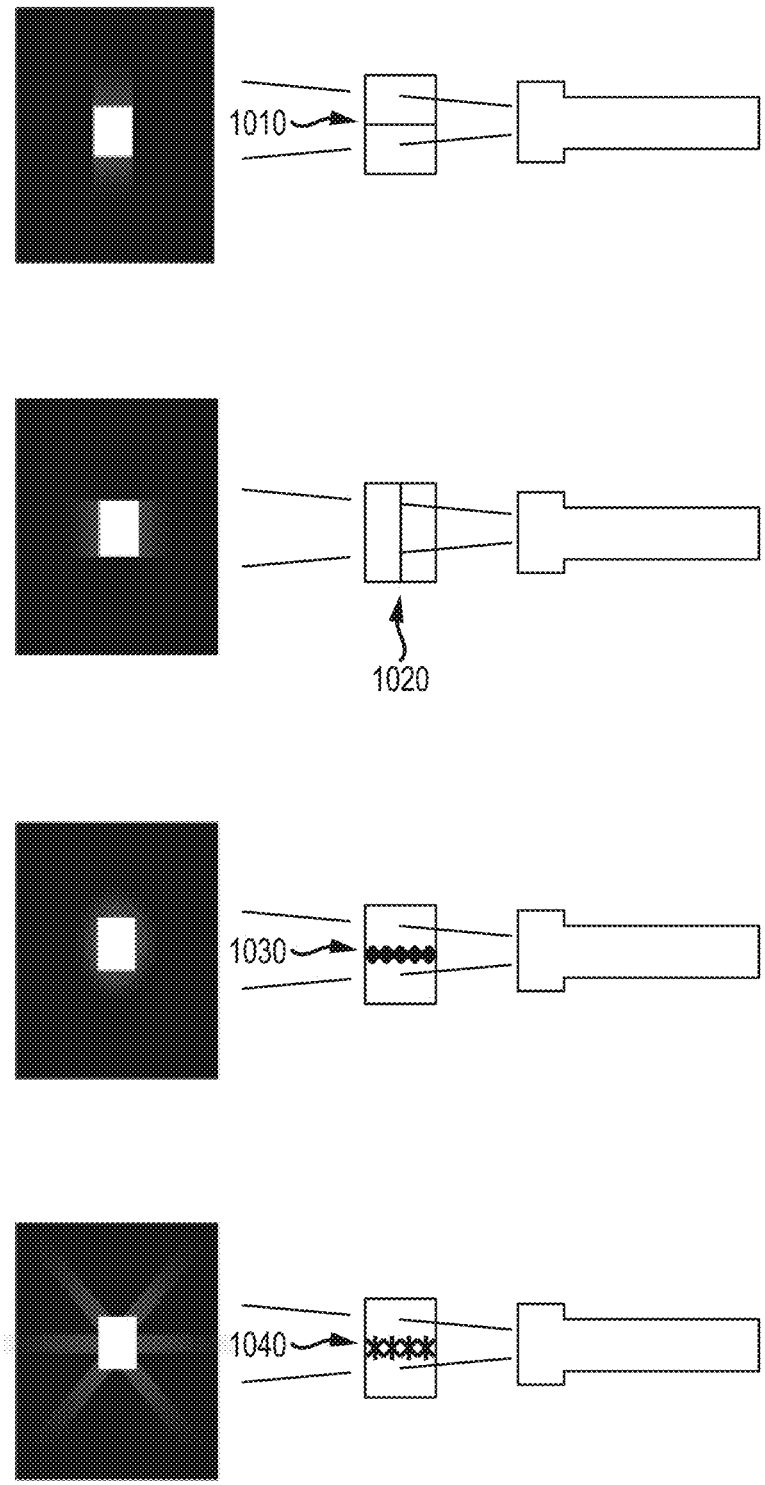
FIG. 10 illustrates an example of image defect suppression when a geometry has been aligned to a PBS seam.

FIG. 10 illustrates example on-screen light behavior resulting from a horizontal linear feature 1010, a vertical linear feature 1020, a sinusoidal feature 1030 and a linear edge sharp point feature 1040. These illustrations depict the difference between unidirectional diffraction and uniform scatter by diffuse or randomized diffraction. Additionally, a beneficial light attenuation may exist due to the obstructing feature also reducing the brightness of the on-screen scatter.

Figure 11:
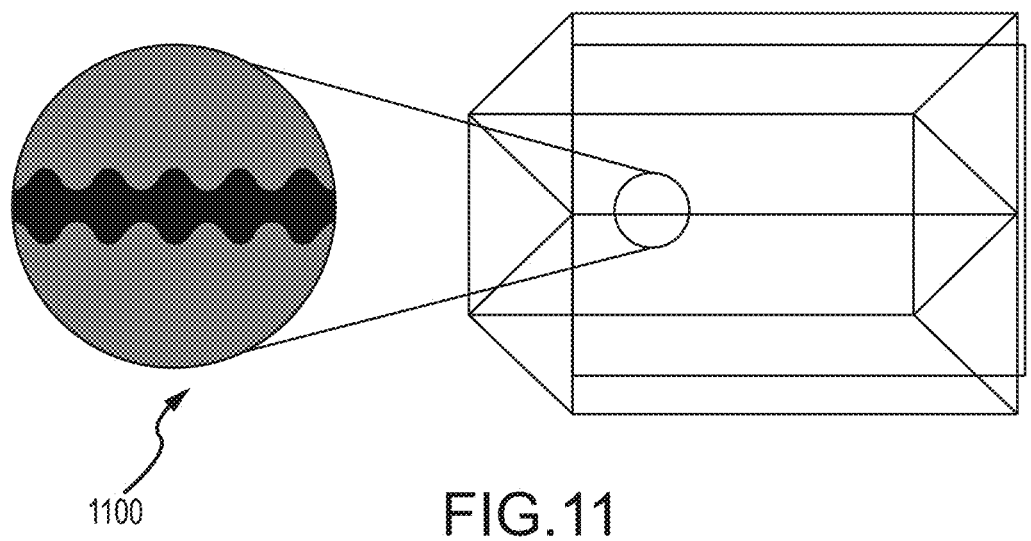
FIG. 11 illustrates a sinusoidal geometry patterned over a PBS seam.

FIG. 11 schematically demonstrates a sinusoidal mask 1100. In this illustration the sinusoidal geometry is patterned onto the center of the planarization plate. During the PBS assembly process the sinusoidal geometry on the planarization plate may be microscopically aligned to the seam at the PBS entrance. In this example, the sinusoidal geometry completely covers the seam and light diffraction becomes randomized and scattered in a controlled fashion from the sine wave edges of the geometry.

Figure 12:
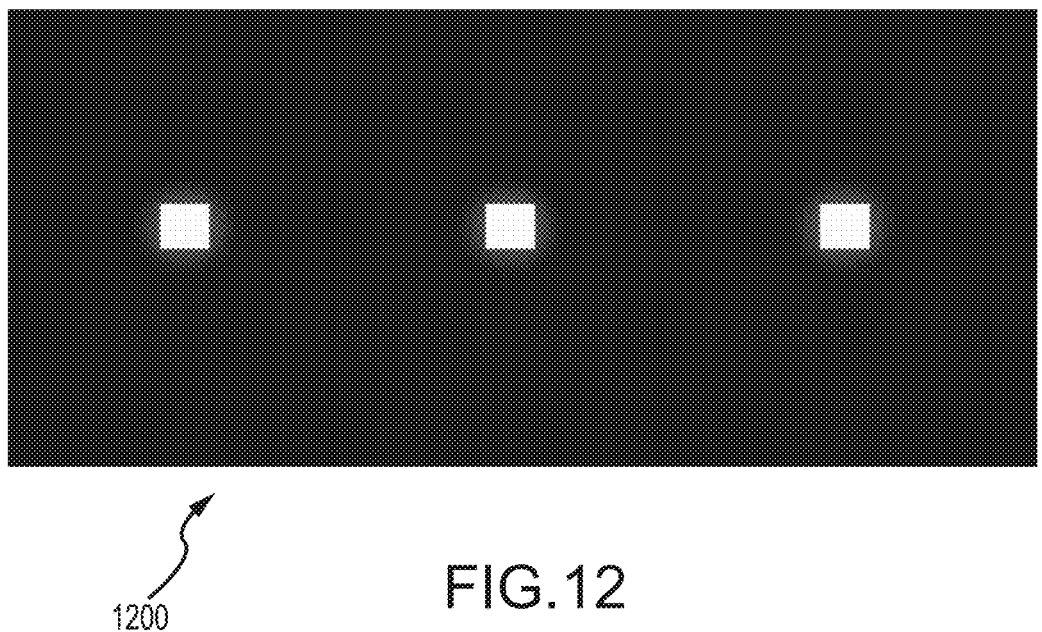
FIG. 12 illustrates an example of on-screen "Image Flare" suppression.

FIG. 12 illustrates an example 1200 of the on-screen "Image Flare" suppression obtained by utilizing the disclosed PBS bonding process. The geometry design randomizes scatter to create a uniform spraying of light and overlap about the projected image which may be far less visible by a viewer. Additionally, a beneficial light attenuation may exist due to the obstructing feature also reducing the brightness of the on-screen scatter.

Figure 13:
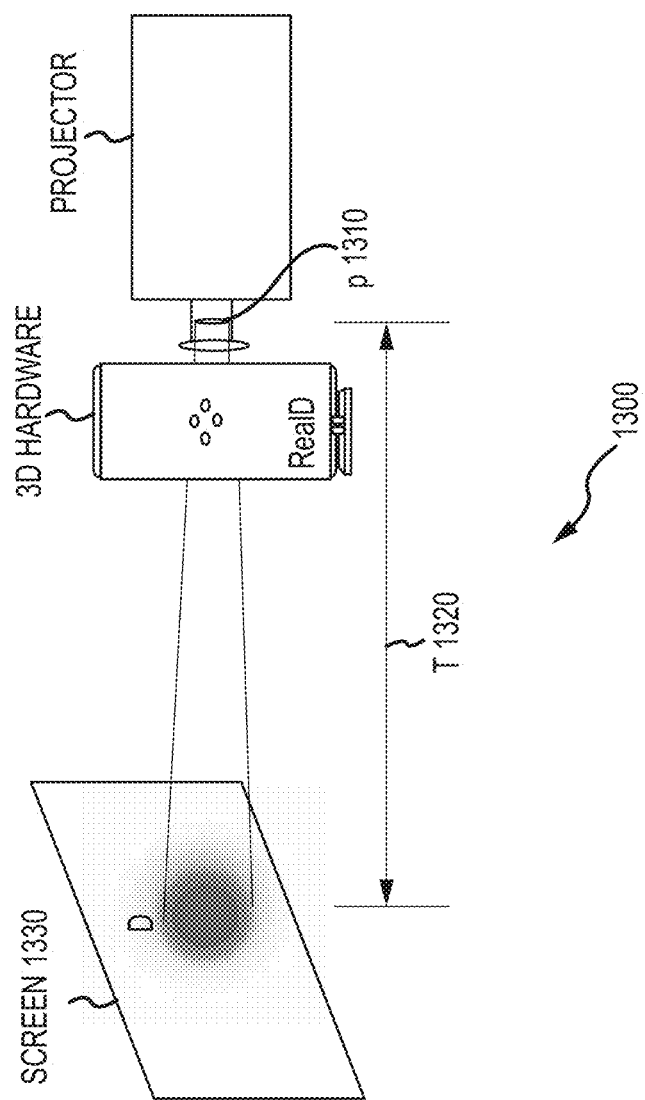
FIG. 13 illustrates a projection system test setup that may predict the observed on-screen effect of a PBS seam when the PBS is present within the test setup light path.

FIG. 13 demonstrates an example 1300 of the effect of the PBS seam. The resulting diffraction pattern width as observed on-screen can be described as the size of the diffraction/scatter on-screen caused by the linear obstructing feature as it relates to distance from the source, and can be expressed by the following: D=FASradians×T, where FAS is Full Angle Spread and T is distance 1320 from pupil (p) 1310 to screen 1330. Here, FAS is derived from the feature obstruction size (σ) in relation to the wavelength of light (λ). For a practical example, if σ is equal to 0.050 mm, p is equal to 25 mm, λ is equal to 0.0005 mm, and T is equal to 12,200 mm; therefore, D equals 122 mm.

Figure 14:
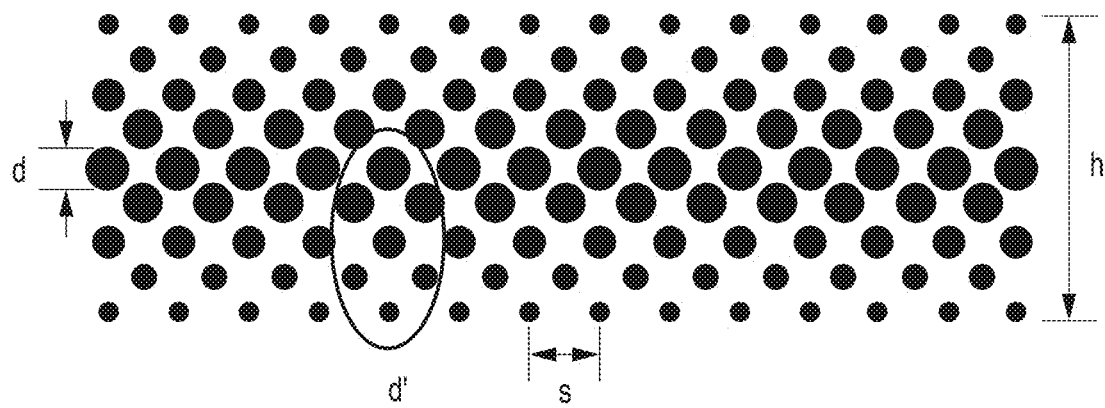
FIG. 14 illustrates variables that may be important to consider in the design of a geometry for use in suppressing on-screen effects caused by a PBS seam.
Figure 14:
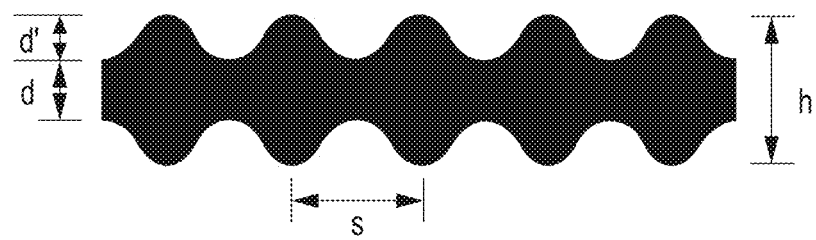
Figure 14:
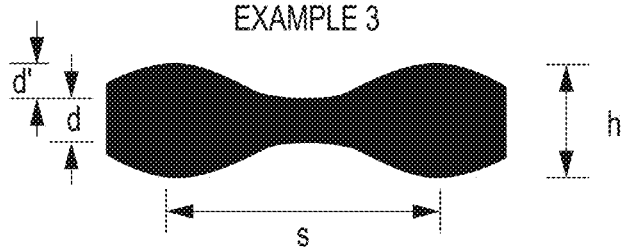
Figure 14:
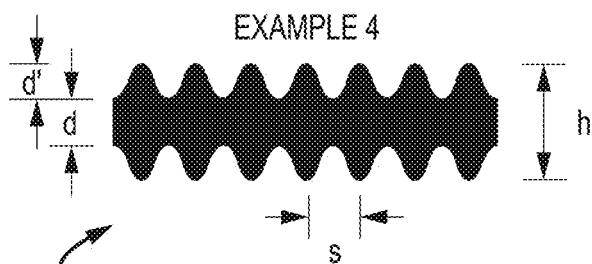

FIG. 14 is a plot 1400 of an example of a pattern of geometric features that can be used as an approach to suppress the unidirectional diffraction caused by a PBS seam. Consideration should be made for the feature layout for the design to be effective at yielding the appropriate amount of controlled scatter to suppress the observed scatter generated at the PBS seam. If the geometric sizes become large there may be a threshold where the region of blocked light becomes visible on-screen and may manifest itself as a dark band. Ideally, the geometries should be large enough to cover or mask the seam with a ratio of overlap that is proportional to the PBS seam width. FIG. 14 shows two examples of these relationships. Example 1 can be referred to as an open pattern, where the geometries that align to the seam do not completely cover the seam and contain a spatial pitch. Example 2 may be referred to as a closed pattern where there exists a solid pattern where a line geometry completely covers the seam and the line boundaries are designed to uniformly control and scatter light. With respect to geometry sizes or line boundary designs, the diffraction caused by these elements may increase as the size and/or pitch decrease. A first-order pass of the geometric relationship can be expressed though the following definitions in Example 1 and Example 2: where, h~p/100, s~0.001 T/Dmm, and d is s/4<d<s/2, and d' is ~≤2d. Here, h is total geometry width, s is the pitch between geometries, d is width of the central-most geometry to be aligned to the seam and d' are the size of the features or boundaries that uniformly scatter light to suppress diffraction caused by the seam. For example, using D, T, and p values from the description of FIG. 13 above, then h is ~0.250 mm, s is 0.100 mm, d is 0.050 mm and d' is 0.025-0.050 mm. In FIG. 14, Examples 2, 3 and 4 demonstrate different configurations of spatial size/amplitude (d, d') and pitch/frequency (s) for a given feature. These feature relationships may directly impact the effectiveness of the geometry solution for unidirectional scatter.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A stereoscopic image apparatus for projecting a stereoscopic image towards an image-forming surface, the stereoscopic image apparatus comprising:
    a polarization beam splitter (PBS) adapted to split an incident image light into a transmitted light having a first state of polarization, and first and second reflected light having a second state of polarization, the second state being different from the first state, wherein the polarization beam splitter comprises at least three prisms that define first and second polarization beam splitting surfaces arranged at an angle to each other, and a junction of the first and second polarization beam splitting surfaces is located on a path of the incident image light and forms a seam;
    a diffracting element located in the input light path and prior to the seam and aligned with the seam, wherein the diffracting element comprises a geometry that performs at least one of blocking a portion of the image light and scattering a portion of the image light;
    a first reflective member in the first exit light path; and
    a second reflective member in the second exit light path, wherein light reflected by the first and second reflective members form a first stereoscopic image on the image-forming surface.

2. The stereoscopic image apparatus of claim 1, wherein the geometry comprises at least one of a sawtooth geometry, an offset sawtooth geometry, a sine wave geometry, an offset sine wave geometry, a square wave geometry, an offset square wave geometry, a stepped square wave geometry, individual lines at differing orientations and spacing, individual circles or ovals at differing orientations and spacing, overlaid geometries, gradient features, and a linear gradient feature having a Gaussian type transmission profile.

3. The stereoscopic image apparatus of claim 1, wherein the at least three prisms comprise:
    a top prism having a first surface adapted to receive the image light on the input light path and a second surface adapted to direct the image light along the first exit light path, wherein the first surface of the top prism and the second surface of the top prism meet to form a first edge, a bottom prism having a first surface adapted to receive the image light on the input light path and a second surface adapted to direct the image light along the second exit light path, wherein the first surface of the bottom prism and the second surface of the bottom prism meet to form a second edge, and wherein the first edge and the second edge meet to form the seam, and a center prism between the top prism and the bottom prism, the center prism having a first surface adjacent to the second surface of the top prism, and the center prism having a second surface adjacent to the second surface of the bottom prism, wherein the first surface of the center prism and the second surface of the center prism meet to form a third edge, and wherein the third edge meets the first edge and the second edge at the seam.

4. The stereoscopic image apparatus of claim 3, wherein the PBS further comprises:

a planarization plate prior to the seam in the input light path, the planarization plate adjacent to the first surface of the top prism and further adjacent to the first surface of the bottom prism.

5. The stereoscopic image apparatus of claim 4, wherein the diffracting element is located on a surface of the planarization plate.

6. The stereoscopic image apparatus of claim 4, wherein the surface of the planarization plate is bonded to the first surface of the top prism and further bonded to the first surface of the bottom prism.

7. The stereoscopic image apparatus of claim 4, wherein the planarization plate comprises optical grade glass.

8. The stereoscopic image apparatus of claim 4, wherein at least a portion of the surface of the planarization plate has an anti-reflective coating.

9. The stereoscopic image apparatus of claim 3, wherein at least a portion of the second surface of the top prism and at least a portion of the second surface of the bottom prism have a reflective coating.

10. The stereoscopic image apparatus of claim 9, wherein the reflective coating comprises a multi-layer thin film reflective coating.

11. The stereoscopic image apparatus of claim 9, wherein the reflective coating comprises a wire grid thin film metal.

12. The stereoscopic image apparatus of claim 3, wherein the first surface of the center prism and the second surface of the center prism meet to form a third edge, and wherein the third edge meets the first edge and the second edge at the seam.

13. The stereoscopic image apparatus of claim 3, wherein the first surface of the center prism is optically bonded to the second surface of the top prism and wherein the second surface of the center prism is optically bonded to the second surface of the bottom prism.

14. The stereoscopic image apparatus of claim 13, wherein an index-matched optically clear adhesive is used for the optical bonding.

15. The stereoscopic image apparatus of claim 1, wherein the diffracting element comprises a chrome or chrome oxide feature produced by a photolithography process.

16. The stereoscopic image apparatus of claim 1, wherein a stereoscopic image is formed by overlapping of the first stereoscopic image and a second stereoscopic image formed from the transmitted light on the image-forming surface.

17. The stereoscopic image apparatus of claim 1, further comprising a polarization modulator adapted to switch the polarization state of the image light on at least one of the first exit light path and the second exit light path between a first state of polarization and a second state of polarization.

18. The stereoscopic image apparatus of claim 17, wherein the polarization modulator comprises first, second and third polarization modulators configured to selectively switch the polarization states of the transmitted light and the first and the second reflected light between the first and the second states of polarization.

19. The stereoscopic image apparatus of claim 18, wherein the geometry comprises at least one of a sawtooth geometry, an offset sawtooth geometry, a sine wave geometry, an offset sine wave geometry, a square wave geometry, an offset square wave geometry, a stepped square wave geometry, individual lines at differing orientations and spacing, individual circles or ovals at differing orientations and spacing, overlaid geometries, gradient features, and a linear gradient feature having a Gaussian type transmission profile.

20. A stereoscopic image apparatus comprising:

a polarizing beam splitter (PBS) adapted to split an incident image light into a transmitted light having a first state of polarization, and first and second reflected light having a second state of polarization, the second state being different from the first state, wherein the polarization beam splitter comprises:

a top prism having a first surface adapted to receive the image light on the input light path and a second surface adapted to direct the image light along the first exit light path, wherein the first surface of the top prism and the second surface of the top prism meet to form a first edge, a bottom prism having a first surface adapted to receive the image light on the input light path and a second surface adapted to direct the image light along the second exit light path, wherein the first surface of the bottom prism and the second surface of the bottom prism meet to form a second edge, and wherein the first edge and the second edge meet to form a seam, and a diffracting element prior to the seam, located in the input light path, the diffracting element aligned with the seam, wherein the diffracting element comprises a geometry that performs at least one of blocking a portion of the image light and scattering a portion of the image light;

a first reflective member in the first exit light path; and a second reflective member in the second exit light path, wherein light reflected by the first and second reflective members form a single stereoscopic image on an image-forming surface.

* * * * *